United States Patent [19]
Graff et al.

[11] 3,894,154

[45] July 8, 1975

[54] CENTER-FILLED GUM

[75] Inventors: Allan H. Graff, Hartsdale; Wayne J. Puglia, Floral Park, both of N.Y.

[73] Assignee: Warner-Lambert Company, Morris Plains, N.J.

[22] Filed: Jan. 14, 1974

[21] Appl. No.: 432,921

[52] U.S. Cl. .................................... 426/5; 426/282
[51] Int. Cl. .......................... A23g 3/00; A23g 3/30
[58] Field of Search ........................... 426/3, 4, 5, 6

[56] References Cited
UNITED STATES PATENTS

| | | | |
|---|---|---|---|
| 810,210 | 1/1906 | Laws | 426/5 |
| 3,071,476 | 1/1963 | Werft et al. | 426/5 |

*Primary Examiner*—A. Louis Monacell
*Assistant Examiner*—J. M. Hunter
*Attorney, Agent, or Firm*—James F. Powers, Jr.; Albert H. Graddis

[57] ABSTRACT

A chewing gum piece having an enclosed cavity formed therein, and a liquid fill in the cavity. The liquid fill includes an aqueous solution having a dissolved solids portion, and glycerin for retarding increases in viscosity of the liquid fill.

9 Claims, No Drawings

CENTER-FILLED GUM

BACKGROUND OF THE INVENTION

1. Field of the Invention

The present invention relates to a center-filled gum piece. More particularly, the present invention relates to a center-filled gum piece comprising a liquid center fill having a formulation for retarding increases in viscosity of the center fill.

2. Description of the Prior Art

Center-filled chewing gums are known in the art. For example, chewing gum pieces having a jam center fill are commercially available in at least Japan, and U.S. Pat. No. 810,210 discloses a chewing gum piece filled with a liquid such as a fruit syrup, or with a semi-liquid such as a paste or jelly.

U.S. Pat. No. 810,210 provides for coating the cavity of the gum piece with a moisture-resisting substance such as butter to slow absorption of the center fill liquid by the gum.

SUMMARY OF THE INVENTION

In accordance with the present invention, there is provided a chewing gum piece comprising an enclosed cavity formed in the gum piece, and a liquid fill in the cavity. The liquid fill includes an aqueous solution having a dissolved solids portion, and a water miscible humectant for retarding increases in viscosity of the liquid fill.

DESCRIPTION OF SPECIFIC EMBODIMENTS

Chewing gum pieces in accordance with the present invention can be manufactured with the apparatus and method disclosed in U.S. Pat. Application Ser. No. 271,086, filed July 12, 1972, by A. H. Graff and R. A. Reggio now U.S. Patent No. 3,806,290, and assigned to the assignee of the present application. The Graff et al Patent Application Ser. No. 271,086 is incorporated herein by reference.

The chewing gum can be formed with commercially available natural or synthetic gum bases. A suitable gum base formulation is disclosed in U.S. Pat. No. 3,303,796. A suitable peppermint gum formulation is as follows:

| Ingredients | Amount |
| --- | --- |
| Gum base | 210 lbs. |
| Glucose (corn syrup) | 160 lbs. |
| Plasticizer | 19 lbs. |
| Sugar (4X) | 611 lbs. |
| Oil of peppermint | 2600 grams |
| 50% by weight Glycerin and $H_2O$ Mixture | 2725 grams |
| Titanium dioxide | 850 grams |

The center liquid fill can be formed by mixing 50 lbs. of glucose (corn syrup), 50 lbs. of invert sugar, 6 lbs. sucrose and 10 lbs. of water. The mixture is heated to provide a master batch aqueous solution having 75 percent by weight of solids dissolved therein. Glycerin, flavoring compounds and coloring are then added to the master batch solution to provide the center liquid fill. Specifically, a suitable peppermint flavored liquid fill for a cavity formed in the above-described peppermint gum can be mixed as follows:

| Ingredients | Amount |
| --- | --- |
| Master batch solution | 45 lbs. |
| Glycerin | 5 lbs. |
| Peppermint oil | 454 grams |
| Titanium dioxide | 2.27 grams |

Consumer tests indicate a marked consumer preference for a perception of liquidity of the center liquid fill. Tests also indicate that such perception of liquidity is significantly diminished when the percentage by weight of water in the liquid fill is 17 percent or less than 17 percent. Thus, it is desirable that the percentage by weight of water in the liquid fill be maintained above 17 percent throughout an anticipated maximum shelf life in the consumer market.

Two lots of center-filled gum having peppermint flavored gum and liquid fill were prepared as described above. However, one lot did not have glycerin in the center fill. Each one of the lots had a liquid fill with an initial percentage by weight of water of about 24.5. The total weight of each piece was about 3.4 grams, and the weight of each liquid fill was about 0.34 grams. Within nine months, the water content in the liquid fill of the lot without glycerin in the liquid fill has fallen to an unacceptable level of 16.9 percent by weight of the liquid fill. On the other hand, the lot having glycerin in the liquid fill still has an acceptable liquid fill water content of 18.4 percent by weight of the liquid fill over the same period of observation.

It is theorized that this surprising increase in liquidity perceptable shelf life of the gum having glycerin in the center fill results from the humectant property of glycerin retarding increases in the viscosity of the liquid fill by the dissolution of gum components, e.g., sugars, or by liquid fill water being absorbed by the gum.

The center liquid fill can comprise glycerin in an amount of about 3 to 20 percent by weight of the liquid fill, preferably about 10 percent; glucose in an amount of about 40 to 60 percent by weight of the liquid fill; invert sugar in an amount of about 40 to 60 percent by weight of the liquid fill; and sucrose in an amount not greater than about 10 percent by weight of the liquid fill, preferably about 6 percent.

The gum pieces can have a generally square shape in top and bottom plan views, and a generally rectangular shape with the width greater than the height in each side elevational view. The sides of the square suitably can each be about 0.765 inch, and the height can be about 0.440 inch. The enclosed cavity for the liquid fill can have the same general shape as the outer surfaces of the gum piece, and with about 0.3 inch square sides, and a height of about 0.15 inch.

It is also contemplated that the present invention can use sugarless chewing gum such as disclosed in U.S. Pat. No. 3,352,689.

What is claimed is:

1. A chewing gum piece comprising an enclosed cavity formed in said gum piece, and a liquid fill in said cavity; said liquid fill including an aqueous solution having a dissolved solids portion, and glycerin for retarding increases in viscosity of said liquid fill.

2. The gum piece of claim 1 wherein said liquid fill includes water in an amount greater than 17 percent by weight of said liquid fill.

3. The gum piece of claim 2 wherein said glycerin is about 3 percent to about 20 percent by weight of said liquid fill.

4. The gum piece of claim 2 wherein said glycerin is about 10 percent by weight of said liquid fill.

5. The gum piece of claim 2 wherein said solids portion includes glucose in an amount of about 40 percent to about 60 percent by weight of said liquid fill.

6. The gum piece of claim 5 wherein said solids portion includes invert sugar in an amount of about 40 percent to about 60 percent by weight of said liquid fill.

7. The gum piece of claim 6 wherein said solids portion includes sucrose in an amount not greater than 10 percent by weight of said liquid fill.

8. The gum piece of claim 6 wherein said solids portion includes sucrose in an amount of about 6 percent by weight of said liquid fill.

9. The gum piece of claim 1 wherein said solution includes flavoring compounds.

\* \* \* \* \*